United States Patent [19]

Danel

[11] 4,100,553
[45] Jul. 11, 1978

[54] UNDER-WATER PHOTOGRAPHIC APPARATUS

[75] Inventor: Francois Henri Paul Danel, St. Martin D'Uriage, France

[73] Assignee: Formaplex S.A., Meylan, France

[21] Appl. No.: 713,836

[22] Filed: Aug. 12, 1976

[30] Foreign Application Priority Data

Aug. 22, 1975 [FR] France .................. 75 26348

[51] Int. Cl.² ............................................ G03B 11/08
[52] U.S. Cl. .................................... 354/64; 354/270; 354/288
[58] Field of Search .............. 354/64, 142, 246, 245, 354/226, 253, 270, 286, 288, 295, 296

[56] References Cited

U.S. PATENT DOCUMENTS

| | | | |
|---|---|---|---|
| 1,286,892 | 12/1918 | Stuber | 354/226 |
| 1,291,452 | 1/1919 | Farmer | 354/288 X |
| 1,420,053 | 6/1922 | Mueller | 354/295 |
| 1,468,091 | 9/1923 | Thalhamner | 354/296 X |
| 3,860,937 | 1/1975 | Wolfe | 354/64 |

Primary Examiner—Edna M. O'Connor
Attorney, Agent, or Firm—Charles E. Brown

[57] ABSTRACT

The present invention relates to apparatus for photography under water, and is directed generally to the complete or partial elimination of the fluid-tight bushings inevitably necessitated for the controls of such apparatus, by transferring to the exterior of the fluid-tight casing of the apparatus, the various devices necessary for the control of exposure of the light sensitive material. The diaphragm of the camera lens is arranged in front of the lens, outside the fluid-tight casing, and is therefore under water when the apparatus is immersed. This permits the variation of the aperture and the exposure time without need of access to the interior of the casing. Also, the lens is produced in the form of a thick meniscus with a concave inlet diopter, the convex diopter of the whole unit being added by the liquid immersion medium itself. This lens has the advantage, apart from the transfer of the diaphragm to the exterior of the casing, that it has great resistance to pressure. The invention provides an under-water photographic apparatus of low production cost and high reliability, having only one fluid-tight bushing for the forward movement of the film, and finds its application both in the form of special devices such as cameras for under water surveillance for which reliable fluid-tightness under high pressure is important and in the form of apparatus intended for a large public.

26 Claims, 13 Drawing Figures

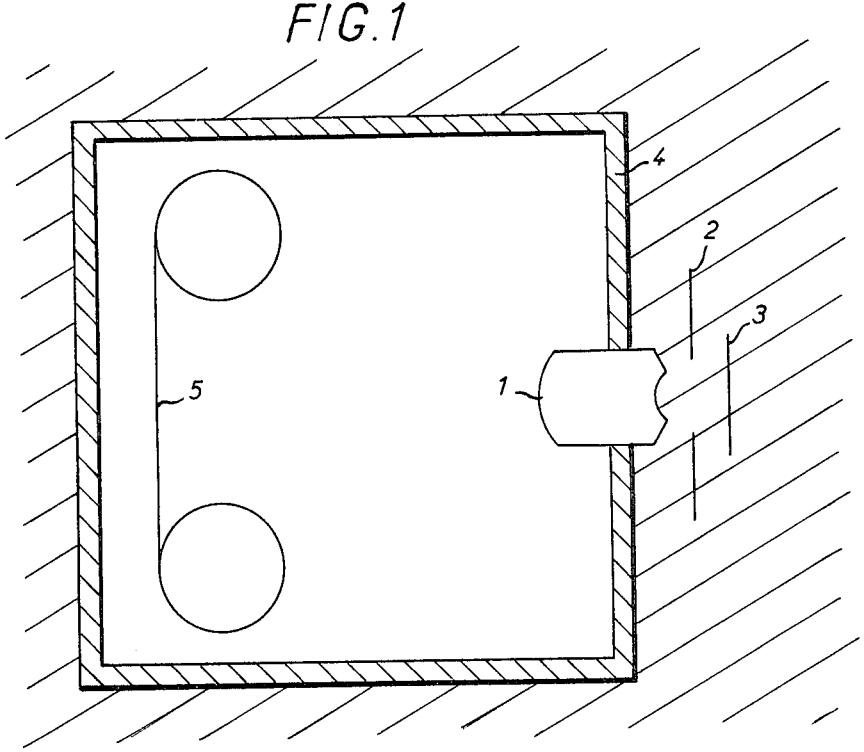
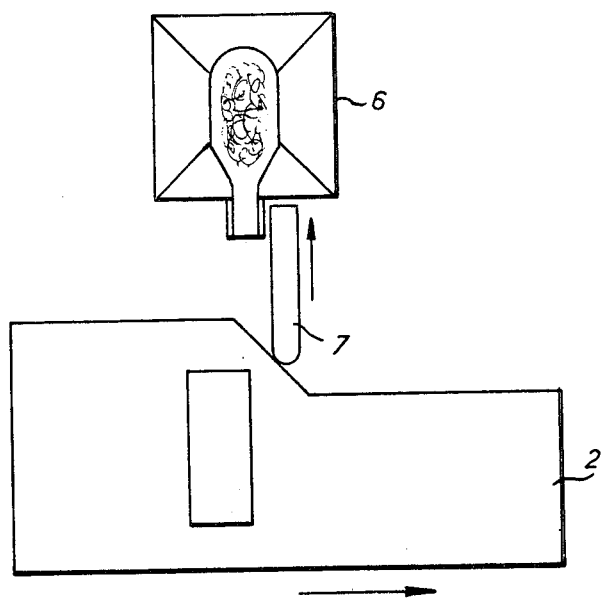

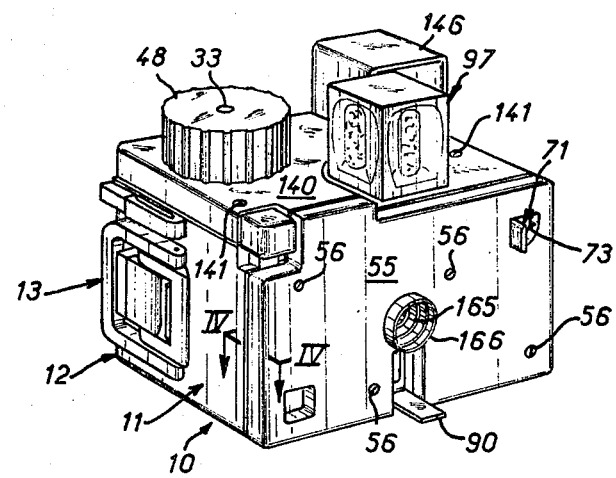
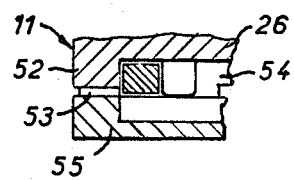
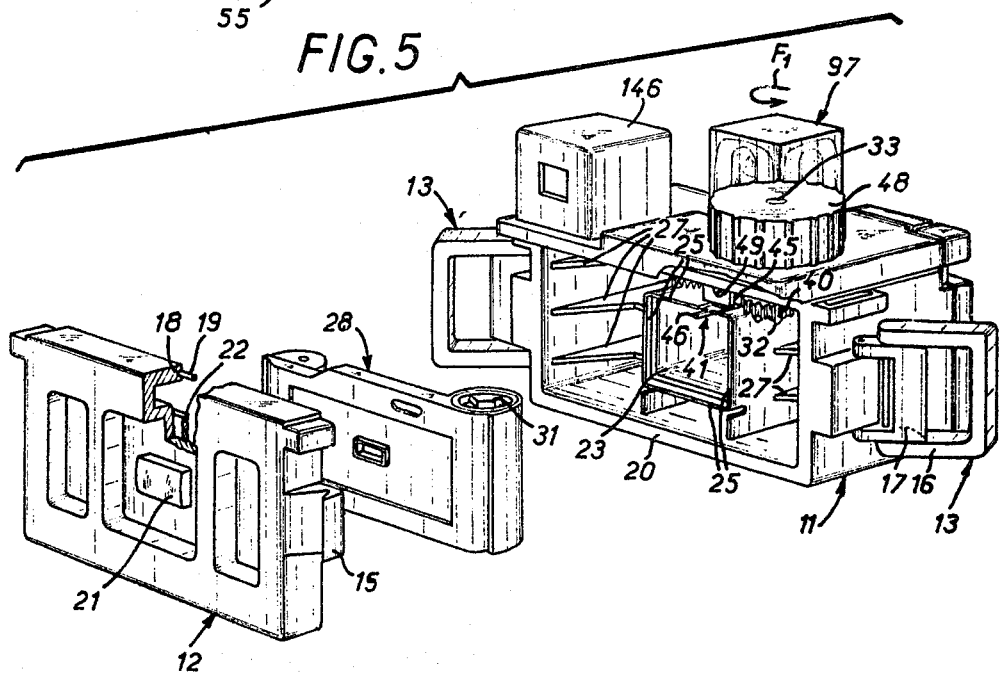

UNDER-WATER PHOTOGRAPHIC APPARATUS

The present invention relates to submarine photographic apparatus permitting the registration of an image under water.

Under-water photographic apparatus known up to the present time consists either of land instruments in which the casing is enclosed in a fluid-tight box provided with a window and fluid-tight bushings for the controls, or integrated instruments in which the casing is itself fluid-tight and comprises a protection for the optical system and the controls which are integrated therewith.

This apparatus is of great complexity of construction, which results either in a high cost or in risks of jamming of the controls under the effect of pressure, or again even in the risk of having the fluid-tight casing flooded with water in consequence of a defect in one of the very numerous fluid-tight bushings with which it must be provided.

The invention is directed generally, if not to the total elimination of the fluid-tight bushings of such an apparatus, at least to minimizing their number by transferring to the outside of the fluid-tight casing of this apparatus the various devices necessary to the required control of the exposure of sensitive material.

More precisely, the invention has for its object an under-water photographic apparatus characterized in that, from a first aspect, the diaphragm of its lens, forming the inlet pupil of this latter, is arranged in front of this lens, outside the casing, so that when the apparatus is immersed, this diaphragm is in the water.

This arrangement results advantageously in the elimination of almost all the fluid-tight bushings of the casing of the apparatus by transferring to the exterior of this latter the various devices usually necessary for the control of exposure of the sensitive equipment utilized, and especially permits modification of the aperture and the exposure time without having any need of access to the interior of the fluid-tight casing of this apparatus in any way whatever.

According to a second aspect, the apparatus according to the invention is further characterized by the production of its lens in the form of a thick meniscus with a concave inlet diopter, the convex diopter necessary to the convergence of the whole unit being added by the water of the aquatic medium itself in which the apparatus is immersed.

A lens of this kind has the particular advantage, in addition to permitting in practice the transfer to the exterior of the casing of the diaphragm which is associated with it, as previously referred to, of having great resistance to pressure.

In brief, the invention makes it possible to produce an under-water photographic apparatus of small production cost and great reliability, comprising solely a single fluid-tight bushing for the forward movement of the film, all the other functions being effected directly from the outside, and finding its application equally well in the form of photographic apparatus intended for a large public and in the form of special devices, cameras for example, intended for under-water surveillance, for which the guarantee of fluid-tightness under high-pressure is important.

The characteristic features and advantages of the invention will furthermore be brought out in the description which follows below, by way of example, reference being made to the accompanying drawings, in which:

FIG. 1 is a diagrammatic view in cross-section of an under-water photographic apparatus in accordance with the invention;

FIG. 2 is a diagrammatic view in elevation of the mechanical coupling according to the invention for ensuring the synchronization of the flash striker on the shutter;

FIG. 3 is a view in perspective of a preferred form of construction of a photographic apparatus according to the invention, seen from the front;

FIG. 4 is a partial view in cross-section to a larger scale of this apparatus, taken along the line IV-IV of FIG. 3;

FIG. 5 is a view of this apparatus in perspective, looking on the rear, with parts broken away locally and the removable bottom partition of the casing of this apparatus taken out.

Figure 6:
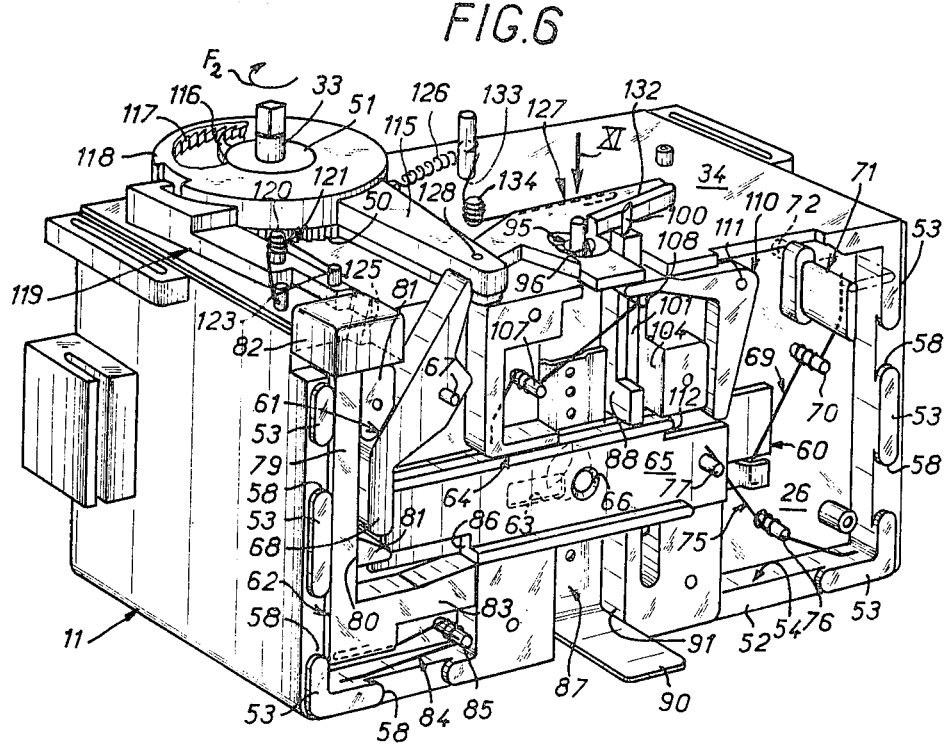
FIG. 6 is a view in perspective of the casing body of the apparatus according to the invention, looking on the front, with local parts broken away and removal of the protection shields fixed on the front and top walls of this casing body, for the tripping position of the various mechanisms with which it is externally provided.

As shown diagrammatically in FIG. 1, the photographic apparatus according to the invention comprises generally a lens 1, the front pupil of which is located in the water, a diaphragm 2 arranged in the plane of this pupil, and a shutter 3 in front of or behind this plane. The lens 1 ensures the continuity of the fluid-tightness of the casing 4 of the apparatus and forms an image on a sensitive surface 5.

As shown diagrammatically in FIG. 2, a possible synchronization of the shock-tripping flash may be effected directly by a mechanical coupling 7 with the shutter. Similarly, a mechanical interlock of the forward movement of the film and the re-setting of the shutter can be carried out under water, together with the rotation of the flash when it is of the cube type.

These arrangements, together with others, will now be described in more detail with reference to FIGS. 3 to 13.

According to the form of embodiment shown in these drawings, the photographic apparatus according to the invention comprises a casing 10 of generally parallelepiped shape, formed by a casing body 11 capable of being closed in a water-tight manner by a removable bottom wall 12.

On its side walls, the casing body 11 carries laterally two attachments 13 each intended to co-operate respectively with hooks 15 projecting for that purpose from the corresponding side edges of the bottom wall 12.

In the example shown, each attachment 13 comprises a flange 16 mounted pivotally on a lug 17 which is in turn pivotally mounted on the casing body 11, this flange 16 being intended to come into engagement with a hook 15 on the bottom wall 12, while the lug 17 on which it is pivotally mounted is intended to be folded back against the corresponding side wall of the casing body 11 in the direction of the front wall 26 of this casing body.

At its periphery, the bottom wall 12 is provided internally with an annular groove 18 in which is provided a sealing joint 19 intended to come to bear against the corresponding edge 20 of the casing body 11.

In its central zone, the bottom wall 12 is provided with a transparent observation window 21.

On its inner face, this bottom wall 12 is provided around the observation window 21 with an elastically deformable mattress 22, the function of which will become apparent later.

Figure 10:
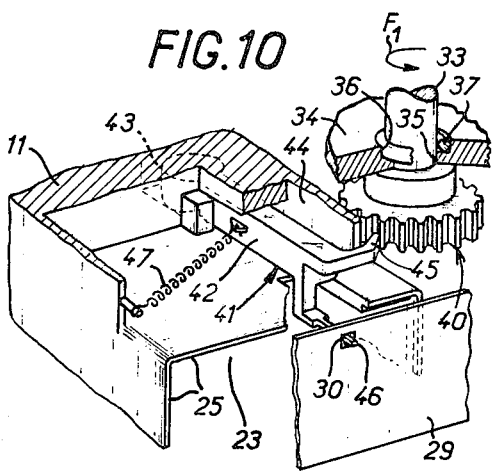
FIG. 10 is a partial view in perspective to a different scale, with parts broken away, of the mechanism contained in the casing body of the photographic apparatus in accordance with the invention.
Figure 12:
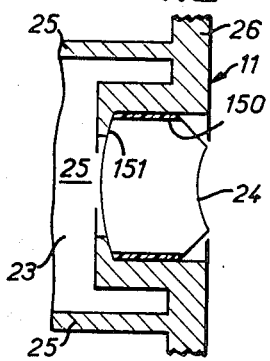
FIG. 12 is a partial view in cross-section of the casing body of the photographic apparatus according to the invention, taken along the line XII-XII of FIG. 8, and relating to the lens of this apparatus.

The casing body 11 forms internally a dark chamber 23, FIGS. 5, 10 and 12, closed towards the front by a lens 24.

According to a characteristic arrangement of the invention, this dark chamber 23 is delimited by four walls 25 which conjointly form a tunnel and which extend continuously from the front wall 26 of the casing body 11 to the immediate vicinity of the edge 20 of this casing body, substantially perpendicularly to the said front wall 26.

In the interior of the casing body 11, ribs 27 contribute additionally to the stiffening of the walls 25 of the dark chamber 23, while forming on each side of this chamber housings intended for the placing in position of a sensitive film.

In the example shown, the photographic apparatus according to the invention is adapted to utilize, as the sensitive film, a film of the size 28/28 usually sold commercially in a pack known as a "pack 126".

A pack of this kind is shown in FIG. 5 under the reference number 28. As these packs are well known in themselves and as they do not form part of the present invention, no detailed description of them will be given here.

It will be sufficient to state that the film 29 which it comprises (see FIG. 10), is provided at intervals with notches 30, and that its winding reel is fixed to a dog-clutch device 31 (FIG. 5) intended for driving the reel.

In the casing body 11 of the photographic apparatus according to the invention is arranged an additional dog-clutch device 32 which, following arrangements known per se is mounted elastically movable in translation on a shaft 33 (FIG. 10), hereinafter known as the forward-movement shaft, while being keyed for rotation on this shaft.

According to a characteristic arrangement of the invention, the forward-movement shaft 33 is the only member to pass through a wall of the casing body 11, namely in practice the upper wall 34 of the said body.

To this end, this upper wall 34 has a circular passage 35 (FIG. 10) with which is associated an annular housing 36 intended for the reception of a sealing joint 37 around the forward-movement shaft 33.

In the interior of the casing body 11, the forward-movement shaft 33 carries a notched wheel 40 (see FIGS. 5 and 10) intended to co-operate with a locking pawl 41.

According to a characteristic arrangement of the invention, this locking pawl 41 is coupled to means responsive to the forward movement of the film 29.

In practice, in the example shown, the locking pawl 41 comprises a barrel 42 which, at one extremity, terminates in a cylindrical bearing surface 43 by which it is pivotally and slidably mounted in a groove 44 provided for that purpose in the casing body 11 and which at its other extremity carries two fingers 45 and 46 in one single block.

The finger 45 forms a pawl generally directed towards the notched wheel 40 of the forward movement shaft 33 and intended to co-operate with this latter in the manner which will be described in detail subsequently.

The finger 46 forms a nipple directed towards the bottom wall 12 associated with the casing body 11 and intended to co-operate with the notches 30 of a film 29, following the methods which will be explained later.

A spring 47 mounted between a wall of the casing body 11 and the barrel 42 of the locking pawl 41 acts obliquely on this latter, simultaneously in the direction of the bottom wall 12 and therefore of a film 39, and simultaneously on one side of the notched wheel 40 of the forward movement shaft 33, for a free rotation of this latter between two exposures, as described below.

In the direction of the bottom wall 12, the locking pawl 41 is retained by a plate 49 (see FIG. 5) added for that purpose on the end of the guiding groove 44 in which it is engaged, only the fingers 45 and 46 of this locking pawl then projecting from this groove.

On the exterior of the casing body 11 (see FIG. 6) the forward movement shaft 33 carries successively a notched wheel 50 and a hub 51, and beyond this latter there may be added to it any desired control member, a knurled knob 48 in the example shown, see FIG. 3.

Figure 7:
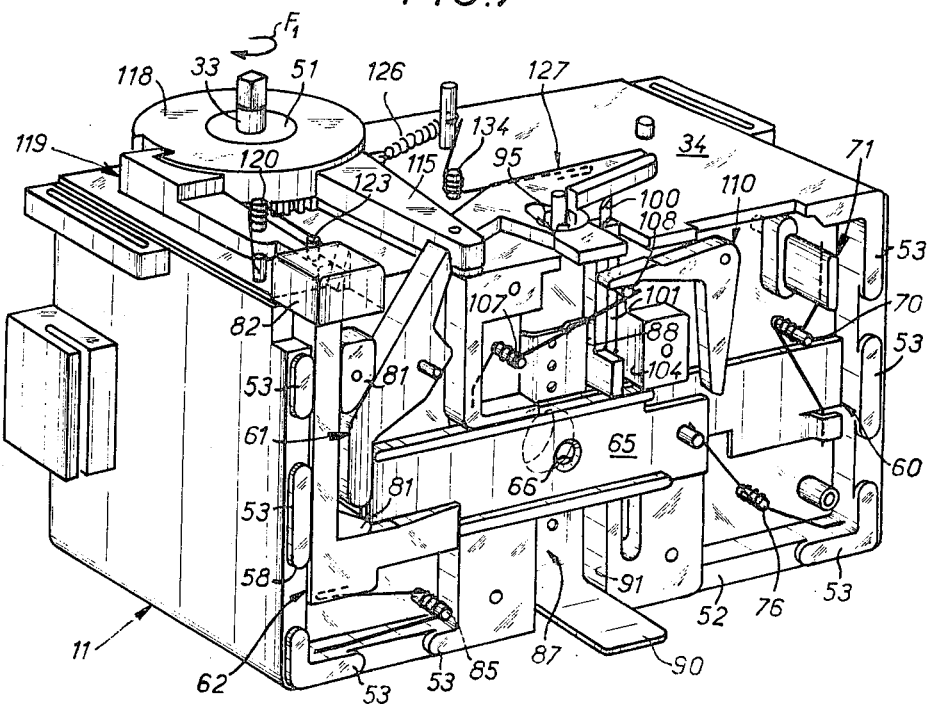
FIG. 7 is a view similar to that of FIG. 6, showing the re-setting position of the mechanisms in question.

As can be clearly seen from FIGS. 6 and 7, the front wall 26 of the casing body 11 is edged on the major part of its perimeter, by an edge 52, and this latter is provided here and there with projecting bosses 53.

This edge 52 defines a space 54, inside which are arranged various parts which are detailed below.

In the example shown, these members are protected by a protection shield 55, FIG. 3, simply added by means of screws 56 on the front wall 26 of the casing body 11.

However, according to a characteristic arrangement of the invention, passages are formed between this protection shield 55 and the front wall 26 on which it is fixed, for a free circulation of water between these parts when the apparatus is under water, that is to say for a free circulation of water in the space 54 serving as a housing for various parts, and also for a free liberation, during such immersion, of the air which may be imprisoned between these members.

In practice, in the example shown, these passages are constituted by the ears 58 which are formed between the bosses 53 of the edge 52 of the front wall 56 of the casing body 11.

Amongst the components which are housed in the space 54 defined above and which are therefore according to the invention entirely arranged on the outside of the casing body 11, figures especially a shutter 60 intended alternately to cover and uncover the lens 24, a setting lever 61 adapted to put the said shutter in the re-set position, and a release knob 62 intended to free the said shutter 60.

According to the invention, the shutter 60 is constituted by an elongated plate which is pierced with an opening 63, generally rectangular in the example shown, and which is movably mounted longitudinally on the front of the casing body 11, between the side walls of this latter, in a passage 64 defined by projections provided for that purpose on the front wall 26 of the casing body 11.

On the shutter 60 is superposed a mask 65 which is also constituted by an elongated plate movably mounted longitudinally in the passage 64 and which is also pierced with an opening 66, generally circular in the example shown.

These two plates are both controlled by elastic means which urge them in the direction of a released position of rest in which, as shown in FIG. 6, they are both supported by their corresponding transverse edge, against the resetting lever 61.

The re-setting lever 61 which is pivotally mounted on a shaft 67 projecting from the front wall 26 of the casing body 11, is provided for that purpose with an arm 68 interposed on the trajectory of the shutter 60 and of the mask 65 associated therewith.

The elastic means associated with the shutter 60 comprise a torsion spring 69, the central torsion portion of which is engaged on a stud 70 mounted so as to project from the front wall 26 of the casing body 11, and one wing of which bears against the shutter 60, in the example shown by means of a slot formed for that purpose in the shutter.

The other wing of this torsion spring 69 is supported against a supporting member 71 capable of occupying at least two distinct positions.

In the example shown, this supporting member 71 is a strap mounted pivotally around a shaft 72.

This strap 71 projects outside the protection shield 55 (see FIG. 3) by means of a quarter-circle opening 73 formed for that purpose in this shield.

For the position of the strap 71 shown in full lines in FIG. 6, the pre-stress of the spring 69 is less than the pre-stress of the spring for the position of the said strap shown in broken lines in this FIG. 6, so that this torsion spring 69 is thus enabled to propel the shutter 60 at different speeds, depending on the position of the strap 71 on which it is supported.

The elastic means associated with the mask 65 are constituted by a torsion spring 75, the central torsion portion of which is engaged on a stud 76 which projects from the front wall 25 of the casing body 11, and one wing of which bears on the stud 77 of this mask 65, while the other wing bears against the ledge 52 of the said front wall 26.

The release push-button 62 has a barrel 79 by which it is slidably mounted in a passage 80 formed between the ledge 52 of the front wall 26 and bosses 81 provided for that purpose projecting from the said wall.

At one of its extremities, this barrel 79 is provided, substantially on a level with the upper wall 34 of the casing body 11, with an operating knob 82 at the disposal of the user.

At its other extremity, the barrel 79 of the release push-button 62 carries substantially at right angles, a retaining arm 83, and it is subjected to the action of elastic means, in practice a torsion spring 84, the central torsion portion of which is engaged on a stud 85 mounted to project from the front wall 26 and the wings of which are respectively in contact on the one hand with the release button 62 and on the other hand with the ledge 52 of this front wall 26.

Under the action of these elastic means, the release button 62 is movable between a release position shown in FIG. 6, for which its retaining arm 83 is in contact with the corresponding longitudinal edge of the plate which forms the shutter 60, and a set position shown in FIG. 7, for which its retaining arm 83 being then in engagement with the corresponding transverse edge of the said plate, it retains the shutter 60 constituted by this plate in the set position.

For a free corresponding movement of the retaining arm 83 of the release button 62, the angle of the plate forming the mask 65 corresponding to this retaining arm 83 is provided with a notch 86.

By reason of this notch, the mask 65 remains in the released position in contact with the arm 68 of the resetting lever 61, when the shutter 60 is in the set position, as shown in FIG. 7.

In a manner known per se, a diaphragm is associated with the lens 24.

In the example of construction shown, this is a simple slider member 87 which is movably mounted transversely with respect to the assembly formed by the shutter 60 and the mask 65, between this assembly and the front wall 26 of the casing body 11, in a passage 88 formed for that purpose by bosses projecting from this front wall.

Figure 8:
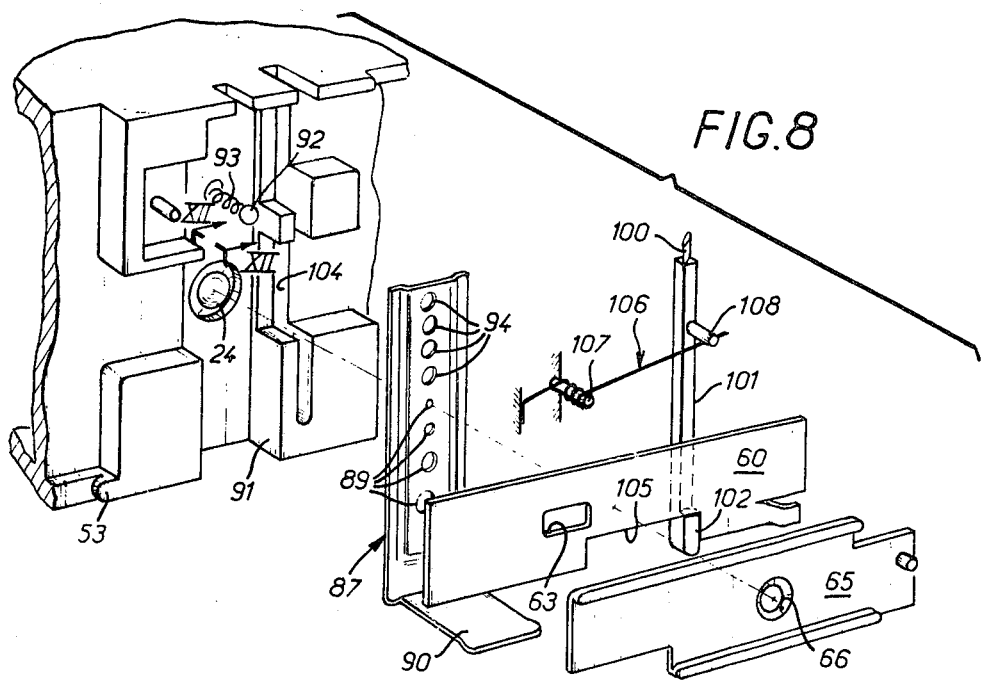
FIG. 8 is a partial view in perspective, similar to that of FIG. 6, and showing in exploded form a detail of this latter.

This slider member is provided with an alignment of holes 89 of different diameters, progressively increasing as shown in FIG. 8, and it is provided laterally at right angles with an operating tongue 90 which, projecting outside the protection shield 55 by means of a passage 91 formed in this latter, is at the disposal of the user as shown in FIG. 3.

For a positive positioning of the slider 87 in one or the other of its positions with respect to the lens 24, a ratchet device with a ball 92 and spring 93 is provided, which co-operates with holes or depressions 94 provided for that purpose on the said slider.

The photographic apparatus according to the invention further comprises a supporting hub 95 for a flash (see FIGS. 6 and 7) rotatably mounted on the upper wall 34 of the casing body 11, in a housing 96 provided for that purpose in this latter, and adapted to receive, by means known per se, a flash 97 (see FIGS. 3 and 5) of the flash cube type.

In known manner, the hub 95 carries projecting teeth 98 (see FIG. 11) and there is associated with it a flash striker 100 movably mounted between a retracted set position in which it permits the upper wall 34 to be disengaged from the casing body 11, and an extended striking position shown in FIGS. 6 and 7, in which it forms a projection on this upper wall.

According to the invention, this flash striker 100 is carried by a barrel 101 which extends on the front of the casing body 11, transversely with respect to the plate which constitutes the shutter 60 and which carries laterally a projecting stud 102, by which it is able to bear against one of the longitudinal edges of this plate.

In the example shown, the barrel 101 of the flash striker 100 is slidably mounted in a groove 104 formed in the front wall 26 of the casing body 11, parallel to the slide 91 of the member 87 constituting the diaphragm, and this barrel is extended beyond the shutter 60, so that it is against the longitudinal edge of this shutter which is farthest away from the upper wall 34 of the casing body 11, that the stud 102 which is carries is able to co-operate.

Figure 9:
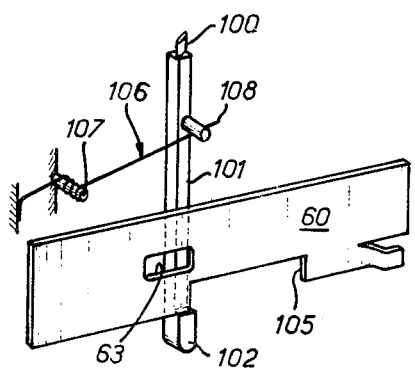
FIG. 9 is a view in perspective showing in turn some of the parts shown in FIG. 8, for the re-setting position of these parts.

As is more clearly shown in FIGS. 8 and 9, this edge is provided for that purpose with a slot 105 forming a cam for the stud 102 of the barrel 101 of the flash striker 100.

At the same time, this barrel 101 is subjected to elastic means, in practice a torsion spring 106, the central portion of which is engaged on a stud 107 projecting from the front wall 26 of the casing body 11, and the wings of which bear, one against a boss on this front wall and the other against a finger 108 projecting laterally from the barrel 101.

These elastic means urge the barrel 101 of the flash striker 100 in a direction corresponding to the extended percussion position of this latter, so that the stud 102 of its barrel 101 is a retaining stud in engagement either with the corresponding longitudinal edge of the shutter 60 (see FIG. 9) when this shutter is in the set position, the flash striker 100 being then itself in the retracted set position, or with the bottom of the notch 105 provided on the said edge (see FIG. 8) when the shutter 60 is in the released position, the flash striker 100 being then itself in the extended percussion position.

In the example shown, a re-setting lever 110 is associated with the flash striker 100 (see FIGS. 6 and 7).

This re-setting lever is an elbowed lever mounted pivotally on a shaft 111 projecting from the front wall 26 of the casing body 11.

One of the arms of this lever co-operates with the finger 108 projecting laterally from the barrel 101 of the flash striker 100, this finger thus constituting in this connection a driving finger for this barrel, while the other arm of the said lever co-operates with a driving shoulder 112 provided for that purpose on the plate which forms the mask 65 associated with the shutter 26.

In the example shown, between the forward movement shaft 33 and the re-setting lever 61 associated with the assembly formed by the shutter 60 and the mask 65, are established uni-directional coupling means which comprise, on the upper wall 34 of the casing body 11, a re-setting arm 115 coupled to the said forward movement shaft 33 by a uni-directional coupling device of the ratchet-wheel or freewheel type.

In practice, in the example shown and as clearly visible in FIG. 6, the hub 51 of the forward-moving shaft 33 is provided with circularly mounted fingers in the form of ratchets 116, elastically deformable and intended to co-operate with the internal teeth 117 of a crown wheel 118 carrying radially on its outer surface the re-setting arm 115.

At the same time, the re-setting lever 61 projects from the front wall 34 of the casing body 11 on the path swept out by the setting arm 115, so that this latter is capable, for the direction of rotation of the forward movement shaft 33 shown diagrammatically by an arrow F2 in FIG. 6, known hereinafter as the backward direction of rotation, of coming into contact with the corresponding extremity of the re-setting lever 61.

At the same time also, a locking pawl 119 is pivotally mounted on the upper wall 34 of the casing body 11, for co-operation with the notched wheel 50 carried at this place by the forward-movement shaft 33.

In practice, this locking pawl 119 is pivotally mounted on a shaft 120 projecting from the upper wall 34 and it is subjected to elastic means which urge it in the direction of the notched wheel 50.

In the example shown, these elastic means are constituted by a torsion spring 121, the central portion of which is engaged on the shaft 120 and of which one of the arms bears against a boss projecting from the upper wall 34 of the casing body 11, and the other on a stud 123 projecting from the locking pawl 119.

This locking pawl 119 is retractable under the control of the release button 62.

In the example shown, the locking pawl 119 is provided for that purpose, at its extremity opposite to the forward movement shaft 33, with an oblique facet 125 by which it is interposed on the travel of the operating knob 82 comprised on the release button 62.

To the re-setting arm 115 is obliquely coupled a spring 126 which urges it in rotation in the direction opposite to that of the arrow F2, known hereinafter as the direct sense of rotation for the forward movement shaft 33.

This re-setting arm 115 is further utilized for actuating a push-rod 127 used for the step-by-step control of rotation of the hub 95 intended, as mentioned above, for supporting a flash 97 of the cube type.

Figure 11:
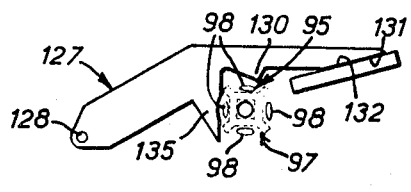
FIG. 11 is a partial view in elevation of one of the members carried externally on this casing body, looking in the direction of the arrow XI of FIG. 6.

This flash push-rod 127 is coupled to the resetting arm 115 by an articulation pivot 128, and as shown in FIG. 11, it comprises a notch 130 intended to come into engagement with a tooth 98 of the hub 95.

The push-rod 127 further comprises a guiding facet 131 intended to co-operate in guiding the sliding movement with a fixed abutment 132 provided for that purpose, projecting from the upper wall of the casing body 11.

The flash push-rod 127 is in this respect subjected to elastic means which urge it in the direction of this support abutment 132. In the example shown, these means comprise a tension spring 133 of which the central torsion portion is engaged on a stud 134 projecting from the upper wall 34 of the casing body 11, and in which the two arms are supported, one on the push-rod 127 and the other on a stud also projecting from the said upper wall 34 (see FIG. 6).

Furthermore, the flash push-rod 127 comprises a supporting facet 135 intended for a pre-determined angular indexing of a flash 97 when this flash is in position on the flash-carrier hub 95, as described below.

Finally, and in the same way as for the front wall 26 of the casing body 11, a protection shield 140 is added by screws 141 on the upper wall of this casing body 11 (see FIG. 3), while forming a space therewith for a free circulation of air or water.

This protection shield 140 may be provided with a view-finder 146, as shown in FIGS. 3 and 5.

The loading of the camera by means of a pack 28 is effected in the usual manner by setting into engagement dog-clutch means 31 with which this pack is fitted, with complementary dog-clutch means 32 carried on the extremity of the shaft of the forward movement shaft 33 (see FIG. 5).

The bottom wall 12 is then added on the casing body 11 and is rigidly fixed thereto by the side fittings 13 of the casing.

As will be understood, the pack 28 then bears against the free edge of the tunnel formed by the walls 25 of the dark chamber 23 and is elastically held in contact with this edge by the elastic mattress 22 which is provided on the inner face of the bottom wall 12.

Taking into account the great rigidity provided by the tunnel in question, the distance of the film of the pack 28 with respect to the lens 24 is strictly defined and remains advantageously constant, irrespective of the depth of immersion of the apparatus, in spite of the pressure which is then applied to the bottom wall 12.

In fact, the tunnel formed by the walls 25 thus opposes any deformation of this bottom wall.

For the forward movement of the film 29 contained in the pack 28, the knurled knob 28 permitting the operation of the forward-movement shaft 33 is rotated in the direction of the arrow F1 of FIG. 5 and FIG. 10, known as the sense of direction of rotation.

By reason of the forward movement which thus results for the film 29, the latter unwinds directly above the finger 46 of the locking pawl 41.

When a recess 30 of the film 29 comes opposite to this finger 46, this latter passes into it due to the action of the spring 47, by sliding in the groove 44 of the locking pawl 41 which carries it.

The locking pawl 41 is from then driven by the film 29, and it thus pivots about the axis of its cylindrical bearing surface 43, until its finger 45 coming into engagement with one of the notches of the notched wheel 40 carried by the forward-movement shaft 33, the movement of rotation of this latter is prevented, which warns the user that a view is correctly presented facing the dark chamber 23.

In order to set the apparatus, it is then necessary to make, again by means of the knurled knob 42, a backward rotation of the forward-movement shaft 33 in the direction of the arrow F2 of FIGS. 6 and 7.

This movement is possible because, for the release position of rest shown in FIG. 6, the retaining arm 83 of the release push-rod 52 is in engagement with the longitudinal edge of the shutter 60 which is farthest away from the upper wall 34 of the casing body 11, and because this release pushrod 62, thus retained in its bottom position, bears against the oblique passage 125 of the locking pawl 119, which holds this latter at a distance from the notched wheel 50 carried by the forward-movement shaft 33.

The backward rotation of the forward-movement shaft 33 has a number of effects.

In the first place, it ensures the re-setting of the apparatus.

In fact, the re-setting arm 115 which, for this backward direction of rotation of the forward-movement shaft 33 is fixed to this latter by the corresponding pawls 116 pushes back the re-setting lever 61 and this by its arm 68 pushes back the shutter 60 and the mask 65 conjointly.

When the shutter 60 and the mask 65 are superimposed, their respective openings 63 and 66 are displaced with respect to each other, so that the common movement of the shutter 60 and the mask 65 does not result in any fortuitous exposure of the lens 24.

When the transverse edge of the shutter 60 comes facing the extremity of the retaining arm 83 of the release push-rod 62, this latter, under the action of its spring 84, is moved in the direction of the upper wall 34 of the casing body 11.

The knob 82 of the release push-rod 62 then escapes from the oblique facet 125 of the locking pawl 119 and this latter, under the action of its spring 21, comes into engagement with one of the teeth of the notched wheel 50 of the forward-movement shaft 33 so that the rotation of this latter in the backward direction then becomes prevented.

The user is thus warned that the re-setting of the apparatus has been effected, and he can thus release the knurled knob 52 of the forward-movement shaft 33.

Under the action of the spring 126, the re-setting arm 115 returns to its initial position without thereby causing any rotation at all of the forward-movement shaft 33, by reason of the uni-directional nature of the coupling means provided for that purpose between this forward-movement shaft and the re-setting arm 115.

Under the action of its spring 75, the mask 65 pushes back the re-setting lever 61 thus released by the resetting arm 115, and this re-setting lever 61 returns to its initial position, which defines the position of rest of the mask 65.

For this position of rest, the opening 66 of the mask 65 is in the axis of the lens 24.

However, on the contrary, the shutter 60 is prevented from returning to its initial position of rest by the retaining arm 83 of the release push-rod 62, and it therefore remains in the re-set position, as shown in FIG. 7.

During its momentary passage from its position of rest to its extended position, the mask 65 has come to act by its shoulder 112 on the re-setting lever 110 of the flash striker 100.

Due to the pivotal movement of which it is then the object, this lever 110 forces the barrel 101 of the flash striker 100 to slide from its extended percussion position to its retracted re-set position, for which (see FIG. 9) the stud 102 which it carries escapes from the recess 105 of the corresponding longitudinal edge of the shutter 60, so as to come into contact with this edge.

The shutter 60 remaining in the re-set position as described above, the flash striker 100 is then itself retained in the re-set position.

During its rotation in the backward direction of the arrow F2, the re-setting arm 115 has actuated the push-rod 127 associated with the supporting hub 95 of the flash.

The notch 130 of this push-rod has then passed elastically over the nearest tooth of this hub, 98.

During its return to the initial position of the re-setting arm 115, the notch 130 of the push-rod 127 is on the contrary in contact with this tooth, and has forced the hub 95 to pivot through a quarter of a turn, or by one step.

It is thus an intact flash lamp 97 present on the supporting hub 95 which is now thus normally in service.

Due to the action of its spring 133, the push-rod 127 is pushed by its facet 131 against the abutment 132, which gives the facet 135 a very definite orientation, in practice parallel to the axis of the lens 24.

The base of the flash 97 coming into contact with this facet 135, as shown diagrammatically in FIG. 11, the angular orientation of this flash is strictly controlled.

As will be understood, rotation of the flash 97 has only become possible because the flash striker 100 was then in the retracted re-set position, as previously mentioned.

The user has then only to choose his diaphragm by acting on the tongue 90 of the slider 87, and the speed by the choice of either of the positions of the pivoted strap 71.

However, conjointly with the preceding operations, the pivotal movement of the forward-movement shaft 33 in the backward direction of the arrow F2 has a second effect.

By the notched wheel 40 keyed on the forward-movement shaft 33 (see FIG. 10), the finger 45 of the locking pawl 41 has been in fact compelled to move back, which has given this locking pawl 41 a pivotal and sliding movement in the groove 44 at the end of which its finger 46 has escaped from the notch 30 of the film 29 with which it was until then in engagement.

Under the effect of the spring 47, the locking pawl 41 then becomes slightly displaced with respect to the film 29 so that on the one hand its finger 45 liberates the notched wheel 40 which will permit a subsequent forward movement of the film 39 when an exposure has been made and when the notched wheel 50 will be liberated in turn by the locking pawl 119, and which on the other hand brings its finger 46 back to a position for which it is no longer facing the previous notch 30 of the film 29, while bearing elastically against this latter in such manner as to be capable to pass again into the following notch of this film.

When the user presses the knob 82 of the release push-rod 62, the retaining arm 83 of this latter liberates the shutter 60 which, under the action of its spring 69, returns to its initial release position.

During this movement, the opening 63 of this shutter 60 uncovers the lens 24 as it passes in front of this lens.

In addition, during its movement, the shutter 60 liberates by its notch 105 the barrel 101 of the flash-striker 100, so that under the action of its spring 106 this latter passes abruptly from its retracted re-set position to its extended percussion position for which it initiates in a manner known per se the entry into action of the flash-lamp concerned.

It should be noted that at the end of the movement of the barrel 101 of the flash-striker 100, the retaining finger 102 of this latter comes into contact elastically against the bottom of the recess 105 of the shutter 60, so that this latter, braked in this manner, is prevented from bouncing undesirably and remains firmly in its release position.

Furthermore, the release push-rod 62 is from that time retained in its bottom position by the shutter 60, its retaining arm 83 bearing against the corresponding longitudinal edge of this latter, as mentioned above, when the shutter is in the released position.

The locking pawl 119 is thus again held at a distance from the notched wheel 50.

The apparatus is then ready for a new operation of forward movement of the film and re-setting.

As will be understood, the circulation of water facilitated between the casing body 11 and the protection shields 55 and 140 fixed on the body is such as to permit of easy cleaning of the corresponding spaces and of the components arranged in these latter, especially when these spaces have been subjected to the ingress of sand for example.

Such a cleaning process may be accelerated by an operation of the control knob 52 of the forward-movement shaft 33 in the backward movement of rotation of this latter, this operation being effected while the release push-rod 62 is held in the depressed position, so that there is no resulting exposure since the shutter 60 and the mask 55 then remain superimposed.

Similarly, the passages provided between the protection shields 55 and 140 and the casing body 11 on which they are fixed facilitate, during immersion, the liberation of air which may be trapped in the corresponding spaces, as mentioned above.

It will be appreciated that the arrangement of the various mechanisms of the apparatus on the outside of the apparatus casing furthermore facilitates the assembly.

It will also be appreciated that the casing body and the bottom wall intended to be fixed on it may easily be produced by moulding from any appropriate material.

The photographic apparatus according to the invention is therefore of simple and economical construction.

FIG. 12 illustrates more particularly the mounting of the lens 24 of this apparatus.

This mounting is effected very simply by glueing into a cylindrical passage 150 of the front wall 26 of the casing body 11, this operation being preferably effected with an adhesive which remains relatively soft after setting, which permits absorption of the stresses resulting from the inevitable differences between the coefficients of thermal expansion of the materials which constitute the lens 24 and the casing body 11.

The passage 150 is partly closed by a supporting machined surface 151 which defines the position of the lens 24 in the wall 26 in a strictly accurate manner.

According to the invention, the lens 24 is composed of a single lens in the form of a thick meniscus, having a concave diopter at the front and a convex diopter at the rear.

This arrangement results advantageously in a lens having in water a short focal distance and a great depth of field.

In addition, it has been found that a lens of this kind is capable of a large tolerance of manufacture.

Finally, by its actual shape and by its support on the bearing surface 151 of the casing body 11, this lens 24 has in itself a high resistance to pressure.

In practice, for a photographic picture size of 24 × 26 mm., dimensions in the vicinity of those indicated below are particularly suitable:

Axial thickness. . 8 mm.;
Concave diopter radius. 9 mm.;
Convex diopter radius..12 mm.;
Lateral wall diameter..12 mm.

These values of dimensions are of course only given here by way of example and may not be considered as restrictive of the scope of the invention.

Furthermore, for sizes other than 24 × 26 mm., homothetical values of those given above should be adopted.

In the foregoing description, the body of the lens has a cylindrical lateral wall, and its concave front diopter is coupled to this wall by a frusto-conical section.

Figure 13:
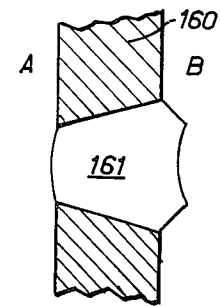
FIG. 13 is a view in cross-section similar to that of FIG. 12 and relating to an alternative form of construction.

In an alternative form shown in FIG. 13, the body of the lens has a conical lateral wall which still further improves its resistance to pressure and the conditions of fluid-tightness which it offers.

It will of course be understood that the present invention is not limited to the form of embodiment described and shown, but includes any alternative form of construction.

In particular, the protection shield 55 may be provided, around the opening 165 which it comprises at the level of the lens 24, with a ledge 166 or any appropriate device intended for the addition of various accessories usual in photographic material and appratus, such as a sunshade, a lens-shade, or even an additional lens capable of permitting the utilization of this apparatus in the open air.

In addition, as shown diagrammatically in FIG. 2, the flash-striker may co-operate with that of the longitudinal edges of the plate constituting the shutter which is closest to the upper face of the casing, this edge then forming a cam adapted to cause the said flash-striker to pass from its position of rest to its percussion position when the shutter passes in turn from its set position to its release position.

What I claim is:

1. A photographic apparatus of the kind comprising a water-tight casing which forms internally a dark chamber, a lens which closes towards the front of said dark chamber, a diaphragm adapted to regulate the aperture of said lens, a shutter adapted alternately to cover and uncover said lens, said shutter having a set position wherein said shutter covers said lens and is ready to be actuated to momentarily uncover said lens, a re-setting lever intended to put said shutter in the set position, and a release push-rod for liberating said shutter, in which said diaphragm is arranged in front of the said lens, on the outside of the said casing, so that when the apparatus is immersed in water, said lens and diaphragm are in direct contact with the water.

2. A photographic apparatus as claimed in claim 1, in which said shutter and said re-setting lever and the release push-rod which are associated therewith are also mounted on the outside of said casing.

3. A photographic apparatus as claimed in claim 2, in which said shutter is constituted by a small plate movably mounted longitudinally on the front of said casing and pierced with an opening, and a mask superimposed on said shutter, said mask also comprising a small plate movably mounted longitudinally and pierced with an opening, each of said small plates being acted upon by elastic means adapted to urge said plate in the direction of a released position of rest for which it is supported against said re-setting lever by one of its transverse edges, said re-setting lever being pivotally mounted on the front of said casing.

4. A photographic apparatus as claimed in claim 3, in which the elastic means associated with the small plate constituting said shutter come into contact with a supporting member adapted to occupy at least two distinct positions.

5. A photographic apparatus as claimed in claim 4, in which said supporting member is a pivotally mounted strap.

6. A photographic apparatus as claimed in claim 2, in which said shutter includes a small plate mounted for longitudinal movement, there is a mask superimposed on said shutter with said mask also being in the form of a small plate, and said release push-rod has a retaining arm and is movable under the action of elastic means between a release position in which it is in contact with one of the longitudinal edges of the shutter small plate and a re-set position in which, in engagement with a transverse edge of said shutter small plate it retains said shutter small plate in the re-set position, and the corresponding edge of the mask small plate associated with said shutter is notched so as to permit the return of said mask to the release position while said shutter is in the re-set position.

7. A photographic apparatus as claimed in claim 2, and further comprising a flash-striker movably mounted between a retracted re-set position and an extended percussion position in which it projects from the upper wall of said casing, and a synchronizing coupling established between said flash-striker and said shutter, said synchronizing coupling being a mechanical coupling established on the exterior of said casing.

8. A photographic apparatus as claimed in claim 7, in which said shutter includes a small plate mounted for longitudinal movement, and said flash-striker extends on the front of the casing transversely with respect to the small plate constituting said shutter and carries laterally a projecting stud by which it bears against one of the longitudinal edges of said shutter small plate, said edge having a recess forming a cam for said stud and adapted to permit said striker to pass from its said retracted re-set position to its said extended percussion position.

9. A photographic apparatus as claimed in claim 8, in which said flash-striker is subjected to the action of elastic means which urge it in the direction of its extended percussion position, the stud carried laterally on said striker being a retaining stud adapted to co-operate with that of the longitudinal edge of the small plate constituting said shutter which is farthest away from the upper face of said casing.

10. A photographic apparatus as claimed in claim 9, in which with said flash-striker is associated an elbowed re-setting lever pivotally mounted on the front of said casing, one of the arms of said lever co-operating with a driving finger carried for that purpose projecting from said flash-striker, while the other arm co-operates with a driving shoulder provided for that purposes on the small plate constituting the mask associated with said shutter.

11. A photographic apparatus as claimed in claim 1, in which said lens is constituted by a single lens in the form of a thick meniscus with a concave front diopter.

12. A photographic apparatus as defined in claim 1, in which is further provided a rotatable shaft known hereinafter as the forward-movement shaft, said shaft passing in a fluid-tight manner through said casing and carrying, outside said casing, an operating member such as a lever or knurled knob and, inside said casing, dog-clutch means adapted for driving in unwinding or forward movement of a sensitive film for a first direction of rotation of said forward movement shaft, known hereinafter as the sense of direction of rotation of said shaft, in which unidirectional coupling means are established on the exterior of said casing between said forward-movement shaft and said re-setting lever.

13. A photographic apparatus as claimed in claim 12, in which said unidirectional coupling means comprise, on the exterior of the casing, a re-setting arm coupled to the forward-movement shaft for the reverse direction of rotation of said shaft by a member for coupling in unidirectional rotation of the ratchet wheel or free-wheel type, said resetting arm being capable of coming into contact with one extremity of said re-setting lever, for the considered direction of rotation of said forward-movement shaft.

14. A photographic apparatus as claimed in claim 13, in which on the exterior of said casing is pivotally mounted a locking pawl adapted to lock said forward movement shaft in rotation under the action of elastic means which urge it in the direction of a notched wheel rigidly fixed on said forward movement shaft and which is retractable under the control of said release push-rod.

15. A photographic apparatus as claimed in claim 14, in which at its extremity opposite to said forward movement shaft, said locking pawl comprises an oblique facet with which said release push-rod is adapted to co-operate in retraction.

16. A photographic apparatus as claimed in claim 12, in which elastic restoring means are coupled to said resetting arm.

17. A photographic apparatus as claimed in claim 12, in which said forward movement shaft is the sole member which passes through a wall of said casing.

18. A photographic apparatus as claimed in claim 13, in which a flash supporting hub is rotatably mounted on the casing and in which a flash push-rod is coupled to said resetting arm for the step-by-step control of rotation of the said hub, on the outside of said casing.

19. A photographic apparatus as claimed in claim 18, in which said hub is a toothed hub and said flash push-rod comprises a driving notch adapted to come into engagement with a tooth of said hub, and a guiding face intended to co-operate as a sliding guide with a fixed abutment provided for that purpose on the exterior of said casing.

20. A photographic apparatus as claimed in claim 19, in which said flash push-rod comprises a further supporting facet, adapted for the angular definite indexation of a flash when such a flash is in position on said flash-carrier hub.

21. A photographic apparatus as claimed in claim 12, in which said forward-movement shaft carries a notched wheel in the interior of said casing, said notched wheel being adapted to co-operate with a locking pawl coupled to means responsive to the forward movement of a film when said film is driven by said shaft.

22. A photographic apparatus as claimed in claim 21, in which said locking pawl is provided with a barrel which is slidably and pivotally mounted at one of its extremities in a groove of said casing and which carries at its other extremity two fingers in one single piece, one for co-operation with the corresponding notched wheel of said forward-movement shaft, the other for co-operation with the notches of a film, said locking pawl being further subjected to the action of elastic means which urge it obliquely simultaneously in the direction of the bottom wall of the casing of said apparatus and away from said notched wheel.

23. A photographic apparatus as claimed in claim 1, in which a protection shield is added to the front wall of said casing.

24. A photograhic apparatus as claimed in claim 23, in which passages are formed between said protection shield and the casing wall on which it is added, for a free circulation of water and/or air in the space formed between such a shield and such a wall.

25. A photographic apparatus as claimed in claim 1, in which a protection shield is added on to the upper wall of said casing.

26. A photographic apparatus as claimed in claim 1, in which said dark chamber is defined by walls forming a tunnel in the interior of said casing, said tunnel being substantially perpendicular to the front wall of said casing.

* * * * *